United States Patent [19]
Tsubai

[11] Patent Number: 5,394,781
[45] Date of Patent: Mar. 7, 1995

[54] SUPPORT STRUCTURE AND GUIDE

[76] Inventor: Ryozo Tsubai, 4619 Pin Oak La., Bellaire, Tex. 77401

[21] Appl. No.: 43,759

[22] Filed: Apr. 7, 1993

[51] Int. Cl.⁶ .............................................. B27B 5/18
[52] U.S. Cl. .................................... 83/449; 83/471.3; 83/486.1; 83/574
[58] Field of Search .................. 83/485, 486, 486.1, 83/487, 488, 489, 574, 471.2, 471.3, 449, 468.7, 477

[56] References Cited

U.S. PATENT DOCUMENTS

| | | | |
|---|---|---|---|
| 1,538,086 | 5/1925 | Buttress | 83/485 X |
| 2,966,086 | 12/1960 | Sjostrom | 83/488 X |
| 4,135,419 | 1/1979 | Chapin | 83/486.1 X |
| 4,995,288 | 2/1991 | Della Polla | 83/486.1 X |

FOREIGN PATENT DOCUMENTS 1058958 2/1967 United Kingdom ................. 83/485

Primary Examiner—Richard K. Seidel
Assistant Examiner—Raymond D. Woods
Attorney, Agent, or Firm—Kenneth A. Keeling

[57] ABSTRACT

A support structure and tool guide for use with circular saws and other hand tools comprising two pairs of parallel, vertically-spaced, horizontally-extending support bars; the upper pair of support bars supporting on rollers a tool support plate which is moveable horizontally along the upper support bars; the lower support bars supporting removable workpiece support members; each workpiece support member including rollers allowing horizontal movement of the workpiece transverse to the upper support bars; the upper support bars vertically adjustable in relation to the lower support bars; and devices for aligning the hand tool longitudinally and transversely in relation to the the support bars.

12 Claims, 3 Drawing Sheets

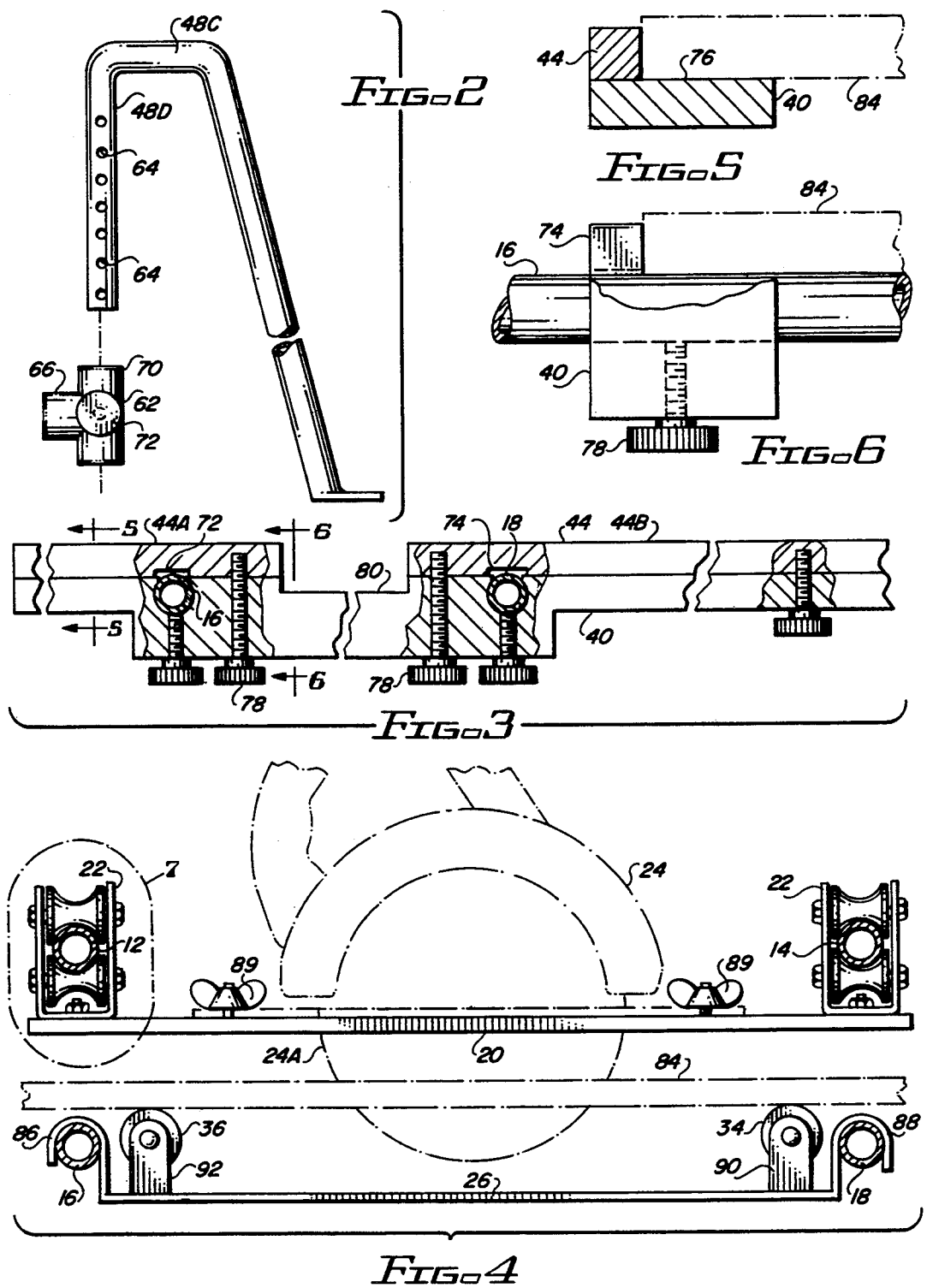

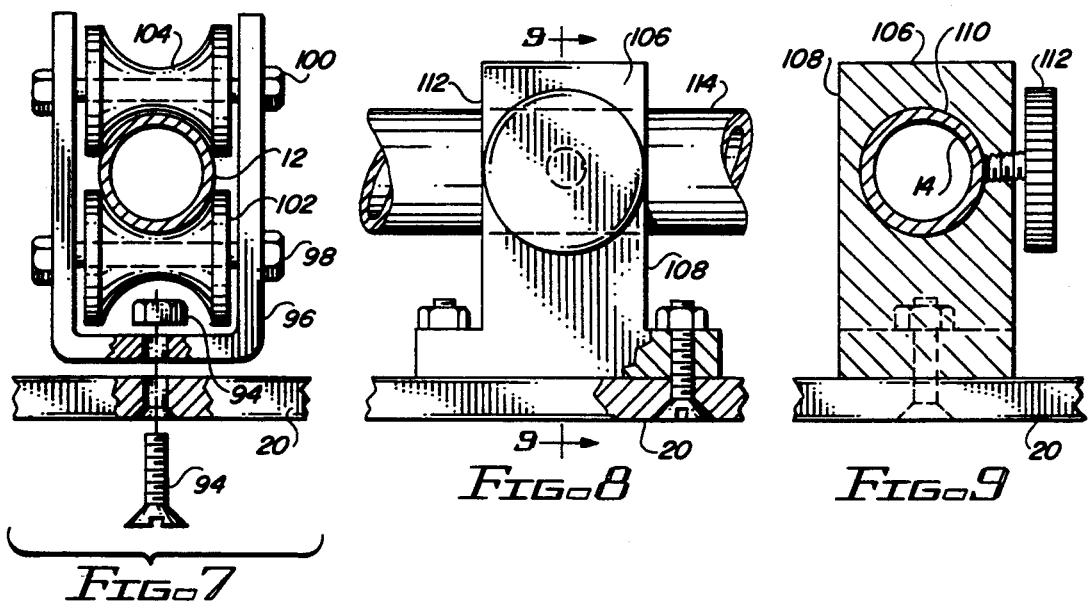
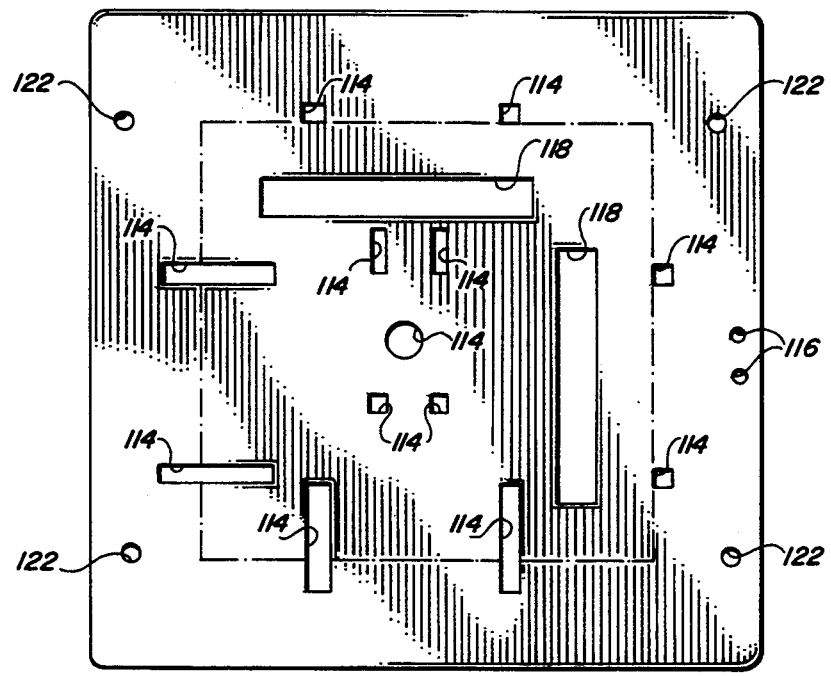
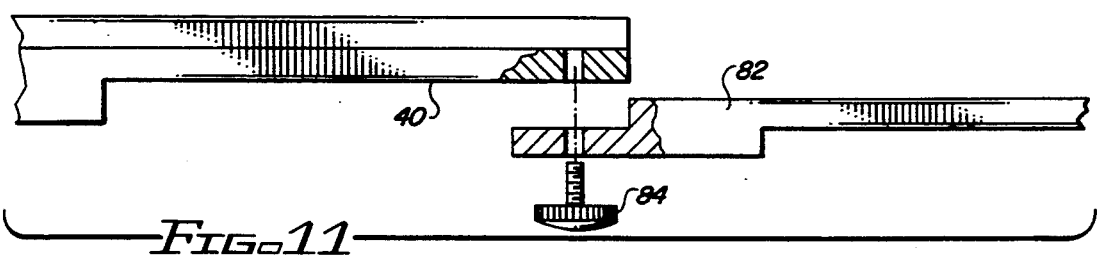

SUPPORT STRUCTURE AND GUIDE

FIELD OF THE INVENTION invention relates generally to the field of support structures and guides for hand-held tools and particularly to an improved portable support structure and rail guide for a hand-held circular saw.

BACKGROUND OF THE INVENTION

Structures for supporting saws and for supporting the wood piece to be cut with saws are known in the art. A variety of saw tables and guides are commercially available. Two popular versions are the standard table saw comprising a surface for supporting the object to be cut and a circular saw blade extending therethrough. Another popular form of saw and saw support structure is the radial arm saw which includes a flat surface with a circular saw supported above the flat surface and moveable in relation therewith. An advantage of table saws and radial arm saws is that they provide support for the workpiece and with appropriate guides, provide uniform linear cuts.

Another widely-used form of saw is a hand-held circular saw comprising a portable structure having handle grips, a motor, and a circular saw blade. The hand-held circular saw may be conveniently transported and used.

The present invention comprises a support and rail guide structure for use with commercially available hand-held circular saws to provide advantages currently associated with table saws and radial arm saws including a support structure for the material to be cut and the capability of making uniform straight cuts utilizing guides in lieu of relying on the skill and coordination of the operator.

Various forms of guides or supports for portable saws have been identified. Gecmen U.S. Pat. No. 2,676,624 discloses a guide carriage for a power driven hand tool. The guide frame comprises a generally rectangular structure supported on rollers. Angular extensions are provided on each end of the structure for retaining a circular saw on the guide carriage. The rollers are located at each end of the carriage. The rollers are operatively engaged with a laterally-extending adjustable guide element, which guide element engages an edge of the workpiece to provide a cutting path a predetermined distance from and parallel to the edge of the said workpiece.

Schmidt U.S. Pat. No. 2,688,347 discloses an adjustable guide for portable saws. The guide is mountable on a handsaw and provides a guide bar disposed below the saw plate parallel to the saw blade. The guide bar is adjustable to position the guide rail at different distances from the saw blades.

Chang U.S. Pat. No. 3,927,475 discloses a saw guide comprising a first member extending perpendicularly from the plate of the saw, a rail guide attached to said first member, and a second member pivotally attached to the rail guide and extending to the rear of the saw plate, the first member and the second member are adjustably connected to the saw plate allowing the rail to be extended a predetermined distance from the saw and consequently the saw blade. The rail guide engages the edge of the workpiece to be cut.

Kloster U.S. Pat. No. 4,016,649 discloses a circular saw guide including a guide frame and a retainer means comprising a U-shaped frame member having a pair of legs and a cross member extending between the opposed legs. An edge guide is coupled between the legs, the edge guide engaging the edge of the workpiece. Saw cradle means are mounted for positioning on the legs. Castor supports are provided on cross member of the U to support the guide frame.

Ong U.S. Pat. No. 4,128,940 discloses a guide and adaptor for hand saws including a first member adapted to receive a part of the hand saw, a second member including an edge for engaging the edge of the workpiece and further including adjustment means for adjusting the engaging edge in relation to the saw, and including tubular means for connecting the first member and second member.

Knetzer U.S. Pat. No. 4,945,799 discloses a guide for guiding a tool on a workpiece. The device includes a guide rod with front and back ends. An angle section is provided for engaging the workpiece surface and edge. The angle section is pivotally connected to the guide rod. A guide tube is provide for releasable attachment to the tool which tube telescopically receives the guide rod.

Collins et al. U.S. Pat. No. 5,080,152 discloses a device for mounting woodworking tools including a pair of spaced rails having a slidable carriage therebetween, the power tool mountable on the carriage mounting plate. The mounting plate is rotatable with respect to the carriage.

Commercially available hand tool guide means and the hand tool guide means described in the aforementioned patents do not disclose nor teach a support structure for supporting large workpieces and providing uniform linear cuts on the workpiece.

It is an object of the present invention to provide an improved support structure and tool guide for portable tools.

It is a further object of the present invention to provide an improved support structure and tool guide for providing uniform linear longitudinal and transverse cutting operations on a relatively large workpiece, as well as relatively small workpieces.

It is a further purpose of the present invention to provide an improved support structure and guide adaptable to a variety of hand-held tools including circular saws and routers.

It is a further purpose of the present invention to provide a readily-transportable support structure and tool guide which is easily assembled and disassembled.

The foregoing and other objects of the present invention are accomplished by an improved support structure and tool guide for use with circular saws comprising two (2) pairs of parallel, vertically spaced, horizontally extending, support bars; the upper pair of support bars supporting by roller means a tool support plate, said tool support plate slidably moveable longitudinally in relation to said upper support bars; said pair of lower support bars supporting workpiece support members, each workpiece support member including channel members at each end for engaging and resting upon the said lower support bars, each workpiece support member further including roller accessory means suspended above the support member, said roller means supporting the workpiece; rail guide supported on the said lower support bars, said rail guide and support means comprising members extending transversely to the said lower support bars, a first surface of said support means and guide rails being generally parallel to the upper edge of the said support bars and a second surface of said support and rail guide members extending above the said support bars; a plurality of legs for supporting the said support structure, adjustment means provided for relative adjustment of the upper support bars in relation to the lower support bars; a plurality of openings provided in the tool support plate including openings for attachment of a tool with the cutting member aligned parallel to the support bars and opening means for aligning the cutting member transverse to the said support bars; said workpiece supported above said lower support bars and below said upper support bars; said tool support plate slidably moveable along said support bars for transverse cuts of the workpiece, and said tool arranged transverse to the said support bars and the workpiece slidably moveable transverse to the said support bars for making longitudinal cuts in the said workpiece.

BRIEF DESCRIPTION OF THE DRAWINGS

FIG. 2 depicts a typical supporting leg of the support structure and guide of the present invention.

FIG. 3 depicts a side view of a support board and guide rail of the present invention.

FIG. 4 depicts a side view of an upper support plate and rollers and a lower support assembly of the present invention.

FIG. 5 depicts a detail of FIG. 3 at 5—5.

FIG. 6 depicts a detail of FIG. 3 at 6—6.

FIG. 7 depicts a detail of a roller connector of the upper support plate.

FIG. 8 depicts a detail of a locking nut mounted to the upper support plate.

FIG. 9 depicts a detail of FIG. 8 along lines 9—9.

FIG. 10 depicts a plan view of the upper support plate.

FIG. 11 depicts an extension for the support board.

DESCRIPTION OF THE PREFERRED EMBODIMENT

Figure 1:
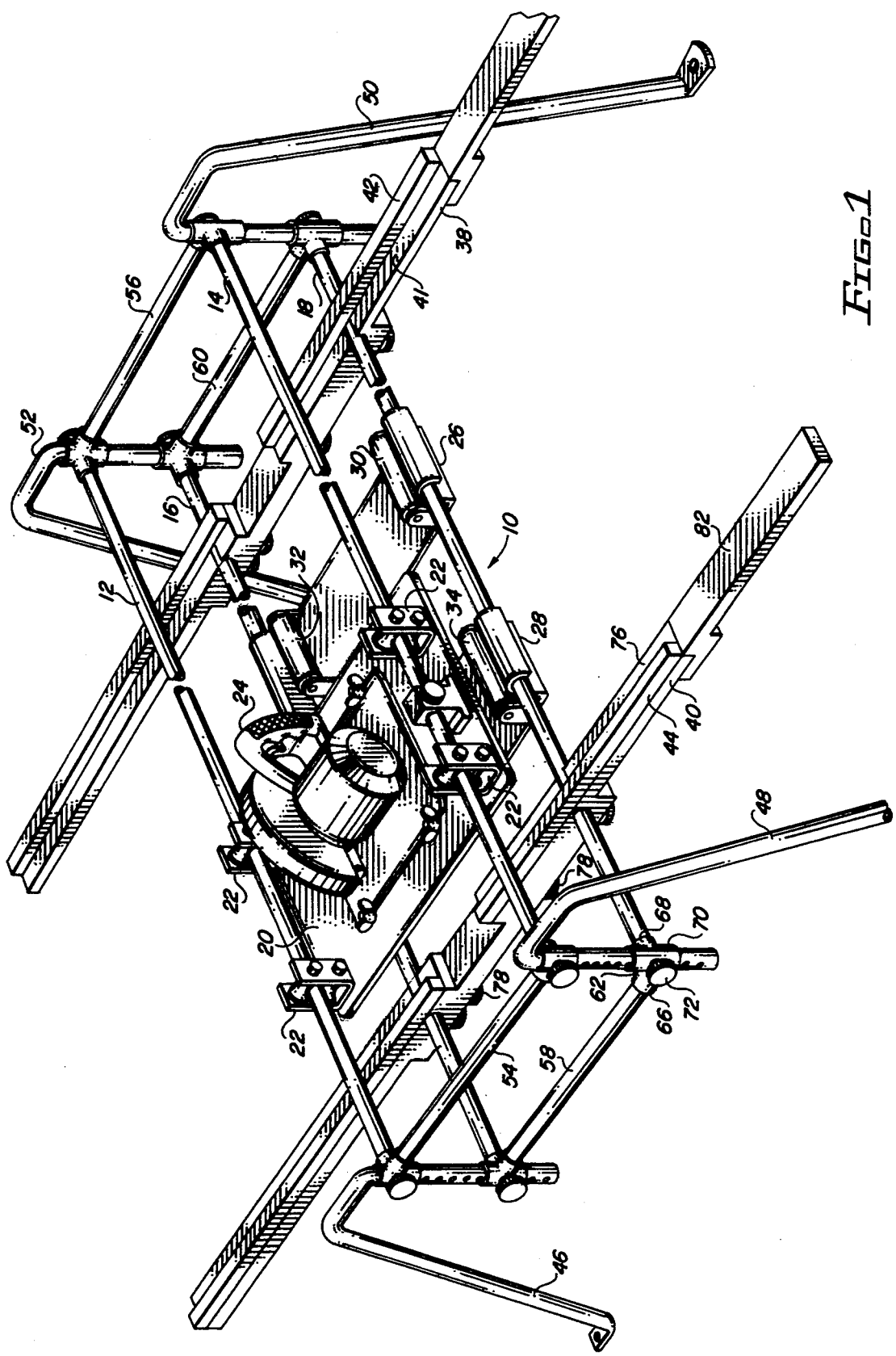
FIG. 1 depicts an isometric view of the support structure and guide of the present invention.

Referring first to FIG. 1, an isometric view of the improved support structure and guide 10 of the present invention is depicted. Support structure and guide 10 include upper support bar and upper support bar 14 and lower support bar 16 and lower support bar 18. Upper support bar 12 and 14 are vertically aligned and parallel. Lower support bars 16 and 18 are parallel and vertically aligned.

Upper plate 20 extends between upper support bar 12 and upper support bar 14, and is supported on upper support bars 12 and 14 by four roller connectors 22. A circular saw 24 is supported on upper plate 20.

Still referring to FIG. 1, lower support assembly 26 and lower support assembly 28 are each supported on lower support bar 16 and lower support bar 18. Lower support assembly 26 supports roller 30 and roller 32 which rollers 30 and 32 are aligned generally parallel to support bars 16 and 18 but slightly higher horizontally than support bars 16 and 18. Lower support assembly 28 supports roller 34 and roller 36 (not shown in FIG. 1) in like manner.

Support board 38 attached to guide rail 42 and support board 40 attached to guide rail 44 are each supported between lower support bars 16 and 18.

Still referring to FIG. 1, leg 46, leg 48, leg 50 and leg 52 are each connected to an end of upper support bars 12 or 14 and to an end of lower support bars 16 or 18.

Upper cross bar 54 and upper cross bar 56 are each connected to legs 46 and 48 or legs 50 and 52. Upper cross bars 54 and 56 are horizontally aligned with and perpendicular to upper support bars 12 and 14. Lower cross bars 58 and 60 are each connected to legs 46 and 48 or legs 50 and 52. Lower cross bars 58 and 60 are horizontally aligned with and perpendicular to lower support bars 16 and 18. Upper cross bars 54 and 56 and upper support bars 12 and 14 define a horizontal rectangular shape. Lower cross bars 58 and 60 and lower support bars 16 and 18 define a horizontal rectangular shape vertically spaced from upper support bars 12 and 14 and upper cross bars 54 and 56.

Referring to FIG. 2, a detail of leg 48 is depicted. Leg 48 comprises a flat foot 48A which flat foot rests on the floor, an inclined section 48B extending angularly upward from foot 48A, a horizontal section 48C extending essentially horizontally and a downwardly extending vertical section 48D. Vertical section 48D is shorter than inclined section 48B. Vertical section 48D is provided with a plurality of apertures extending horizontally through the said vertical section 48D.

Each of legs 46, 48, 50, and 52 include a horizontal foot 47, an upwardly extending angularly oriented section, an upper horizontal section and a downwardly extending vertical section. Support bars 12 and 14 and lower support bars 16 and 18, upper cross bars 54 and 56 and lower cross bars 58 and 60 each connected to one of the downwardly extending vertical sections.

Still referring to FIG. 2, the means of connection of upper support bars 12 and 14 and upper cross bar 54 to leg 48 is depicted, such means comprising pipe connector 62. Pipe connector 62 includes a vertically aligned tube member 70 which vertically aligned tube member 70 slidably fits over leg section 48D. Tube section 66 extends horizontally from tube member 70. A like extending tube section 68 (not shown in FIG. 2, see FIG. 1) extends horizontally from the vertically aligned tube member 70 such tube section 68 being perpendicular to each of tube section 66 and tube member 70.

Each of upper support bars 12 and 14 and lower support bars 16 and 18 are tubular structures provided with interior (female) threading at their ends. Connector 62 is connected to leg 48 by sliding vertical tube member 70 onto leg section 48D, inserting screw 72 through an aperture 64 and screw 72 into the threading provided in the end of upper support bar 14. Screw 72 is provided with a broad head and knurling at the outer edge of the head for attachment by hand. Upper cross bar 54 is fixedly attached to tube extension 66. Connector 66 is typical of the connectors used to connect upper support bars, lower support bars, and cross bars to legs. Like connectors are provided to connect leg section 48D with lower support bar 16 and lower cross bar 58. In like manner, like connectors are provided to connect leg members 46, 50, and 52 with upper support bars 12 and 14 and upper cross bars 54 and 56 and lower support bars 16 and 18 and lower cross bars 58 and 60.

The connectors are fixedly attached to the cross bars. Therefore, the frame structure defined by upper support bars 12 and 14, lower support bars 16 and 18, cross bars 54, 56, 58, and 60 and legs 46, 48, 50, and 52 may be erected by appropriate alignment and insertion of threaded screws of which screw 72 is typical.

Each of legs 46, 48, 50, and 52 are structured such that the inclined sections of the legs extend outwardly from the upper support bars 12 and 14 and lower support bars 16 and 18 thereby resisting overturning of the support structure and guide 10.

Referring now to FIG. 3, a partial side view of support board 40 and guide rail 44 is depicted. Aperture 72 and parallel aperture 74 are provided transversely through support board 40. Apertures 72 and 74 are so sized as to allow lower support bar 16 and lower support bar 18, respectively, to slidably fit therethrough. Apertures 72 and 74 each intersect the upper surface 76 of support board 40.

Support board 40 comprises an elongated member horizontally arranged with upper surface 76 generally parallel to support bar 16 and support bar 18, said support bars 16 and 18 each extends slightly above said upper surface 76. Support bar 40 and guide rail 44 may be longitudinally arranged with respect to support bar 16 and support bar 18 by slidably moving support board 40 and guide rail 44 thereon.

Guide rail 44 is placed above support board 40 and is fixedly attached to support board 40 by screws 78 provided along the extension of guide rail 44 and support board 40. Guide rail 44 is not as wide as the upper surface 76 of support board 40. The function of guide rail 44 is to abut the outer edge of the workpiece (not shown) in operation.

Still referring to FIG. 3, a channel 80 is provided transversely across the upper portion of support board 40 between lower support bar 16 and lower support bar 18. Channel 80 is provided to allow the cutting blade 24A of the circular saw 24 to extend below the upper surface 76 of support board 40 without cutting into support board 40. Guide rail 44 comprises two separate sections, 44A and 44B, each section 44A and 44B extending from channel 80 toward opposing ends of support board 40.

Support board extension 82 is provided at an end of support board 40 and connected thereto by screw 84. Support board extension 82 may be installed for longer workpieces and removed when not needed by means of screw 84. Support board extension 82 is typical of support board extensions provided for each end of support board 40 and support board 38.

Support board 38 and guide rail 42 are constructed in like manner as support board 40 and guide rail 44. Guide rail 42 functions to abut the edge of the workpiece opposite the workpiece edge abutting guide rail 44.

Referring now to FIG. 5, a cross-sectional view of support board 40 and guide rail 44 is depicted. The workpiece 84 is depicted by dashed lines. Workpiece 84 rests slightly above or on upper surface 76, the edge of workpiece 84 abutting guide rail 42.

Referring now to FIG. 6, a view of FIG. 3 along lines 6—6 is depicted, such view depicting support board 40, guide bar 44, workpiece 84, and support bar 16. Workpiece 84 rests slightly above or on surface 76 abutting rail guide 44. Upper support bar 16 extends transversely through aperture 72 (represented by dashed lines) of support board 40.

Referring now to FIG. 4, a side view of upper plate 20 and lower support assembly 26 is depicted. Circular saw 24 is depicted in FIG. 4 by dashed lines. The saw blade 24A of saw 24 extends downwardly and through workpiece 84, workpiece 84 also being depicted by dashed lines. Circular saw 24, as depicted in FIG. 4 is oriented at a right angle to the orientation depicted in FIG. 1. Circular saw 24 is fixedly attached to upper plate 20 by four screws and wing nuts 89. Circular saw 24 is arranged such that blade 24 is aligned perpendicular to upper support bars 12 and 14 and lower support bars 16 and 18.

Roller connectors 22 are fixedly attached to upper plate 20, each of said roller connectors 22 engaging either upper support bar 12 or upper support bar 14.

Still referring to FIG. 4, lower support assembly 26 is provided with inverted U-shaped channel extension 86 and inverted U-shaped channel extension 88 at distal ends of lower support assembly 26. U-shaped channel extension 86 is inverted in relation to lower plate 26, the U-shaped channel extension 86 being so sized as to closely fit over lower support bar 16. Likewise, inverted U-shaped channel extension 88 provided at the distal end of lower support assembly 26 is so sized as to fit over lower support bar 18. U-shaped channel extension 86 and U-shaped channel extension 88 are slidably moveable on lower support bar 16 and lower support bar 18 along the length of lower support bar 16 and lower support bar 18 allowing for longitudinal adjustment of lower support assembly 26 in relation to lower support bar 16 and lower support bar 18. U-shaped channel extensions 86 and 88 allow lower plate 26 to be readily removed when not in use.

Still referring to FIG. 4, roller 34 extends above and parallel to lower support assembly 26, supported by roller support 90. In like manner, roller 36 is provided above and parallel to lower support assembly 26, supported by roller support 92. Roller 34 and roller support 90 are so sized in relation to U-shaped channel extension 88 that roller 34 extends slightly above the upper edge of U-shaped channel extension 88. Likewise, roller 36 and roller support 92 are so sized in relation to U-shaped channel extension 86 that roller 36 extends slightly above the upper edge of U-shaped channel extension 86.

The upper edges of rollers 34 and 36, and the upper edges of rollers 30 and 32 extend slightly higher than the upper surface 76 of support board 40 and the corresponding upper surface 41 of support board 38.

Referring to FIG. 1, lower support assembly 28 is constructed in like manner to lower support assembly 26 and is also slidably moveable on, and readily removable from, lower support bars 16 and 18.

Referring now to FIG. 7, a detail of roller connector 22 is depicted. Roller connector 22 is connected to upper plate 20 by conventional screw and nut 94. Roller connector 22 comprises a channel member 96 supporting a first axle 98 and a second axle 100. Axle 98 and axle 100 are vertically spaced and extend horizontally between the sides of the channel member 96. Axle 98 supports roller wheel 102, said roller wheel 102 having a concave lateral surface, said concave lateral surface being generally sized to conform with the outer circumference of upper guide bar 12. Axle 100 likewise supports roller wheel 104, roller wheel 104 having a concave lateral surface. Roller wheel 102 and roller wheel 104 in combination attach roller connector 22 to upper support bar 12 in a fixed vertical relationship while allowing relative longitudinal movement of roller connector 22 on upper support bar 12. Roller 104 rests on support bar 12. Upper plate 20 is restrained from relative upward movement by roller 102. In like manner, other roller connectors 22 connect upper plate 20 to upper support bar 12 and upper support bar 14.

Referring now to FIG. 8, set screw assembly 106 is depicted. Set screw assembly 106 comprises a support block 108 bolted to upper plate 20. A circular passage 110 (not shown in FIG. 8) is provided in support block 108, said circular passage 110 being so sized as to accommodate upper support bar 14. A set screw 112 extends through support block 108, the end of set screw 112 engaging the exterior surface of upper guide bar 14. Set screw assembly 106 may be engaged to prevent longitudinal movement of upper plate 20 on guide bar 14.

Referring now to FIG. 9, a cross-section of the set screw assembly 106 is depicted showing the set screw 112 engaging the outer surface of upper support bar 14, thereby preventing relative movement of upper plate 20 in relation to upper support bar 14.

Referring now to FIG. 10, a plan view of an isolated upper plate 20 is depicted. Upper plate 20 is provided with four connector block apertures 122 for connecting connector blocks 22 with upper plate 20. Upper plate 20 is provided with a plurality of apertures 114 for connecting the circular saw 24 to the upper plate 20. Upper plate 20 is provided with apertures 116 for attaching set screw assembly 106 to upper plate 20. Upper plate 20 is provided with two apertures 118, the apertures 118 each being similarly sized and extending at right angles to each other, apertures 118 being so sized as to allow the saw blade 24A to extend therethrough. Apertures 114 and apertures 118 may, in other embodiments, be differently arranged to allow connection of other hand-held tools, such as routers, sabre saws, and so forth.

Referring now to FIG. 11, a detail of connection of support board extension 82 to support board 40 as depicted. Such support board extension 82 is releasably connected to support board 40 by means of screw 84.

OPERATION

Referring again to FIG. 1, the operation of the present invention may be seen. Circular saw 24 is clamped to upper plate 20 by wing nuts 84 through apertures 114. As depicted in FIG. 1, circular saw 24 is aligned so that saw blade 24A is parallel to upper support bars 12 and 14 and lower support bars 16 and 18. Lower support assembly 26 and lower support assembly 28 are normally removed prior to making a cut with the saw arranged as shown in FIG. 1. The workpiece to be cut is inserted transverse to the orientation of saw blade 24A, the edges of the workpiece being supported by lower support bars 16 and 18, or for small pieces, the upper surface 76 of support board 40 and the corresponding upper surface 41 of support board 38, the outer edges of the workpiece abutting guide rail 42 and guide rail 44. Support board 38 and guide rail 42 and support board 40 and guide rail 44 may be moved along lower support bars 16 and 18 to provide for such abutment of guide rail 42 and guide rail 44 with the edges of the workpiece. When the workpiece has been placed in position for a lateral cut, circular saw 24 may be turned on and moved along upper support bars 12 and 14 to provide a uniform linear traverse cut on the workpiece. The saw 24 should be moved backward to avoid reactive buckling.

In the event that a longitudinal cut on the workpiece is desired (ripping), the circular saw 24 may be removed from the upper plate 20, reinserted at a right angle to the circular saw orientation depicted in FIG. 1 (see FIG. 4) and again attached to upper plate 20 with wing nuts 89. The workpiece may then be inserted over rollers 32 and 36. When the desired position of saw blade 24A is determined, set screw 112 may be engaged to prevent lateral movement of upper plate 20 and circular saw 24 in relation to upper support bars 12 and 14. The circular saw 24 may then be engaged and the workpiece moved in relation to saw blade 24A, over rollers 30, 32, 34, and 36. The said rollers 30, 32, 34, and 36 provide for relatively reduced friction while moving the workpiece. The guide bars 42 and 44 prevent lateral movement of the workpiece.

The workpiece 84 is normally supported on lower support bars 16 and 18 when lower support assemblies 26 and 28 are removed. The workpiece 84 is normally supported on rollers 30, 32, 34, and 36 when lower support assemblies 26 and 28 are installed. In either event, support boards 38 and 40 and support board extensions 82 provide additional support for the edges of relatively large workpieces 84.

While the FIGS. 1 through 11 and description contained herein refer to a circular saw, the support system and guide 10 is adaptable for use with other hand-held tools such as routers, sabre saws, drills and the like. The support system may be readily assembled and may be readily disassembled for transport and storage.

This invention has been described with reference to a specific embodiment. It will be obvious to one skilled in the art that modifications and variations may be constructed without departing from the spirit and scope of the invention.

I claim:
1. An improved support structure and guide for hand-held tools comprising:
   frame means including spaced, elongated upper rods extending generally horizontally in a first direction and spaced, elongated lower rods extending generally horizontally in said first direction;
   said lower rods supporting workpiece support means;
   said lower rods vertically spaced from said upper rods;
   said lower rods parallel to said upper rods;
   tool support means attached to said upper rods by a plurality of roller assemblies;
   each of said roller assemblies comprising at least two vertically spaced rollers, said rollers having concave surfaces for receiving said rods;
   vertical movement of said tool support means limited by said rollers;
   said tool support means horizontally moveable in said first direction along said upper rods;
   said tool support means including attachment means for attaching a tool to said tool support means, said attachment means including means for aligning said tool in said first direction and for aligning said tool in a generally horizontal second direction perpendicular to said first direction.

2. A support structure and guide according to claim 1 further comprising
   said workpiece support means including a crosspiece extending between said lower rods, at least one crosspiece roller attached above said crosspiece, the rotational axis of said at least one crosspiece roller aligned in said first direction;
   said at least one crosspiece roller facilitating movement of a workpiece in said second direction.

3. An improved support structure and guide according to claim 2 further comprising
   guide means slidably attached to said lower rods, said guide means including spaced, elongated guide rails slidably attached to said lower rods, said guide rails extending generally horizontally and perpendicular to said lower rods in said second direction.

4. A support structure and guide according to claim 3 wherein removable extensions are provided for removeable attachment to said guide means.

5. A support structure and guide according to claim 2 further comprising
   locking means to connect said tool support means to at least one of said upper rods to prevent relative movement of said tool support means in relation to said upper rods.

6. A support structure and guide according to claim 2 further comprising
   a plurality of legs supporting said frame means, each of said legs including an outwardly extending inclined section and including a vertically extending section, said vertically extending section extending downwardly from an upper end of said inclined section, said vertically extending section relatively shorter than said inclined section, each of said vertically extending sections connected to at least one of said upper rods and to at least one of said lower rods.

7. A support structure and guide according to claim 6 wherein
   each of said vertically extending sections is adjustably connected to said at least one of said upper rods and to said at least one of said lower rods for relative vertical positioning of said at least one of said upper rods in relation to said lower at least one of said rods.

8. An improved support structure and guide for hand-held tools comprising:
   frame means including spaced, elongated upper rods extending generally horizontally in a first direction and spaced, elongated lower rods extending generally horizontally in said first direction;
   tool support means attached to said upper rods by a plurality of roller assemblies;
   said lower rods supporting workpiece support means;
   said lower rods vertically spaced from said upper rods;
   said lower rods parallel to said upper rods;
   each of said roller assemblies including vertically spaced rollers, said rollers having concave surfaces for receiving said rods between said rollers;
   vertical movement of said tool support means limited by said rollers;
   said tool support means horizontally moveable in said first direction along said upper rods;
   said tool support means including attachment means for attaching a tool to said tool support means, said attachment means including means for aligning said tool in said first direction and for aligning said tool in a generally horizontal second direction perpendicular to said first direction;
   said workpiece support means including a crosspiece extending between said lower rods, at least one crosspiece roller attached above said crosspiece, the rotational axis of said at least one crosspiece roller aligned in said first direction;
   said at least one crosspiece roller facilitating movement of a workpiece in said second direction;
   a plurality of legs supporting said frame means, each of said legs including an outwardly extending inclined section and including a vertically extending section, said vertically extending section extending downwardly from an upper end of said inclined section, said vertically extending section relatively shorter than said inclined section, each of said vertically extending sections connected to at least one of said upper rods and to at least one of said lower rods.

9. A support structure and guide according to claim 8 wherein
   each of said vertically extending sections is adjustably connected to said at least one of said upper rods and to said at least one of said lower rods for relative vertical positioning of said at least one of said upper rods in relation to said at least one of said lower rods.

10. A support structure and guide for handheld tools in accordance with claim 9 further comprising
    locking means to connect said tool support means to at least one of said upper rods to prevent relative movement of said tool support means in relation to said upper rods.

11. An improved support structure and guide in accordance with claim 8 further comprising
    guide means slidably attached to said lower rods, said guide means including spaced, elongated guide rails slidably attached to said lower rods, said guide rails extending in said second direction.

12. An improved support structure and guide for hand-held tools comprising:
    frame means including spaced, elongated upper rods extending generally horizontally in a first direction and spaced, elongated lower rods extending generally horizontally in said first direction;
    tool support means attached to said upper rods by a plurality of roller assemblies;
    said lower rods supporting workpiece support means;
    said lower rods vertically spaced from said upper rods;
    said lower rods parallel to said upper rods;
    each of said roller assemblies comprising at least two vertically spaced rollers, said rollers having concave surfaces for receiving said rods between said rollers;
    vertical movement of said tool support means limited by said rollers;
    said tool support means horizontally moveable in said first direction along said upper rods;
    said tool support means including attachment means for attaching a tool to said tool support means, said attachment means including means for aligning said tool in said first direction and for aligning said tool in a generally horizontal second direction perpendicular to said first direction;
    said workpiece support means including a crosspiece extending between said lower rods, at least one crosspiece roller attached above said crosspiece, the rotational axis of said at least one crosspiece roller aligned in said first direction;
    said at least one crosspiece roller facilitating movement of a workpiece in said second direction;
    a plurality of legs supporting said frame means, each of said legs including an outwardly extending inclined section and including a vertically extending section, said vertically extending section extending downwardly from an upper end of said inclined section, said vertically extending section relatively shorter than said inclined section, each of said vertically extending sections connected to at least one of said upper rods and to at least one of said lower rods
    each of said vertically extending sections adjustably connected to said at least one of said upper rods and to said at least one of said lower rods for relative vertical positioning of said at least one of said upper rods in relation to said lower at least one of said rods;

guide means slidably attached to said lower rods, said guide means including spaced, elongated guide rails slidably attached to said lower rods, said guide rails extending generally horizontally and perpendicular to said lower rods in said second direction;

locking means to connect said tool support means to at least one of said upper rods to prevent relative movement of said tool support means in relation to said upper rods.

* * * * *